(12) United States Patent
Miyahara

(10) Patent No.: US 8,913,312 B2
(45) Date of Patent: Dec. 16, 2014

(54) IMAGE PROCESSING METHOD AND APPARATUS USING VIRTUAL COLOR GAMUT INFORMATION IN ASSOCIATION WITH COLOR STANDARDS AND PROCESSED STATISTICALLY TO OFFSET A DIFFERENCE IN COLOR REPRODUCIBILITY OF AN OUTPUT APPARATUS

(71) Applicant: Seiji Miyahara, Tokyo (JP)

(72) Inventor: Seiji Miyahara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/058,555

(22) Filed: Oct. 21, 2013

(65) Prior Publication Data

US 2014/0126004 A1    May 8, 2014

(30) Foreign Application Priority Data

Nov. 6, 2012 (JP) .................................. 2012-244692

(51) Int. Cl.
  *H04N 1/60* (2006.01)
(52) U.S. Cl.
  CPC ........... *H04N 1/6052* (2013.01); *H04N 1/6061* (2013.01)
  USPC ....................................................... 358/518
(58) Field of Classification Search
  None
  See application file for complete search history.

(56) References Cited

U.S. PATENT DOCUMENTS

| | | | | |
|---|---|---|---|---|
| 7,345,787 B2 * | 3/2008 | Ito et al. | ............ | 358/1.9 |
| 7,369,272 B2 * | 5/2008 | Ito et al. | ............ | 358/1.9 |
| 7,450,267 B2 * | 11/2008 | Ito et al. | ............ | 358/1.9 |
| 7,471,415 B2 * | 12/2008 | Ito et al. | ............ | 358/1.9 |
| 7,595,919 B2 * | 9/2009 | Tsuji | ............ | 358/518 |
| 7,633,658 B2 * | 12/2009 | Tsuji | ............ | 358/518 |
| 8,204,303 B2 * | 6/2012 | Dalal et al. | ............ | 382/167 |
| 8,643,908 B2 * | 2/2014 | Hama et al. | ............ | 358/3.23 |
| 8,786,904 B2 * | 7/2014 | Miyahara | ............ | 358/1.9 |

FOREIGN PATENT DOCUMENTS

| | | |
|---|---|---|
| JP | 2002-252785 | 9/2002 |
| JP | 2007-213575 | 8/2007 |
| WO | WO 2005/048583 A1 | 5/2005 |

* cited by examiner

*Primary Examiner* — Scott A Rogers
(74) *Attorney, Agent, or Firm* — Oblon, Spivak, McClelland, Maier & Neustadt, L.L.P.

(57) ABSTRACT

An image processing system includes a color standard storage unit that stores multiple color standards that output apparatuses having a shared output method specify range of color reproduction, a virtual color gamut information unit stored associated with the color standard, associated with the color standard, and processed statistically, a color space converter that converts image data input from a network into image data in color space of the color standard, and a preview image generator that color-compresses the image data in the color standard within range of color reproduction of the output apparatus and generates a preview image from the image data generated after color-compression.

10 Claims, 14 Drawing Sheets

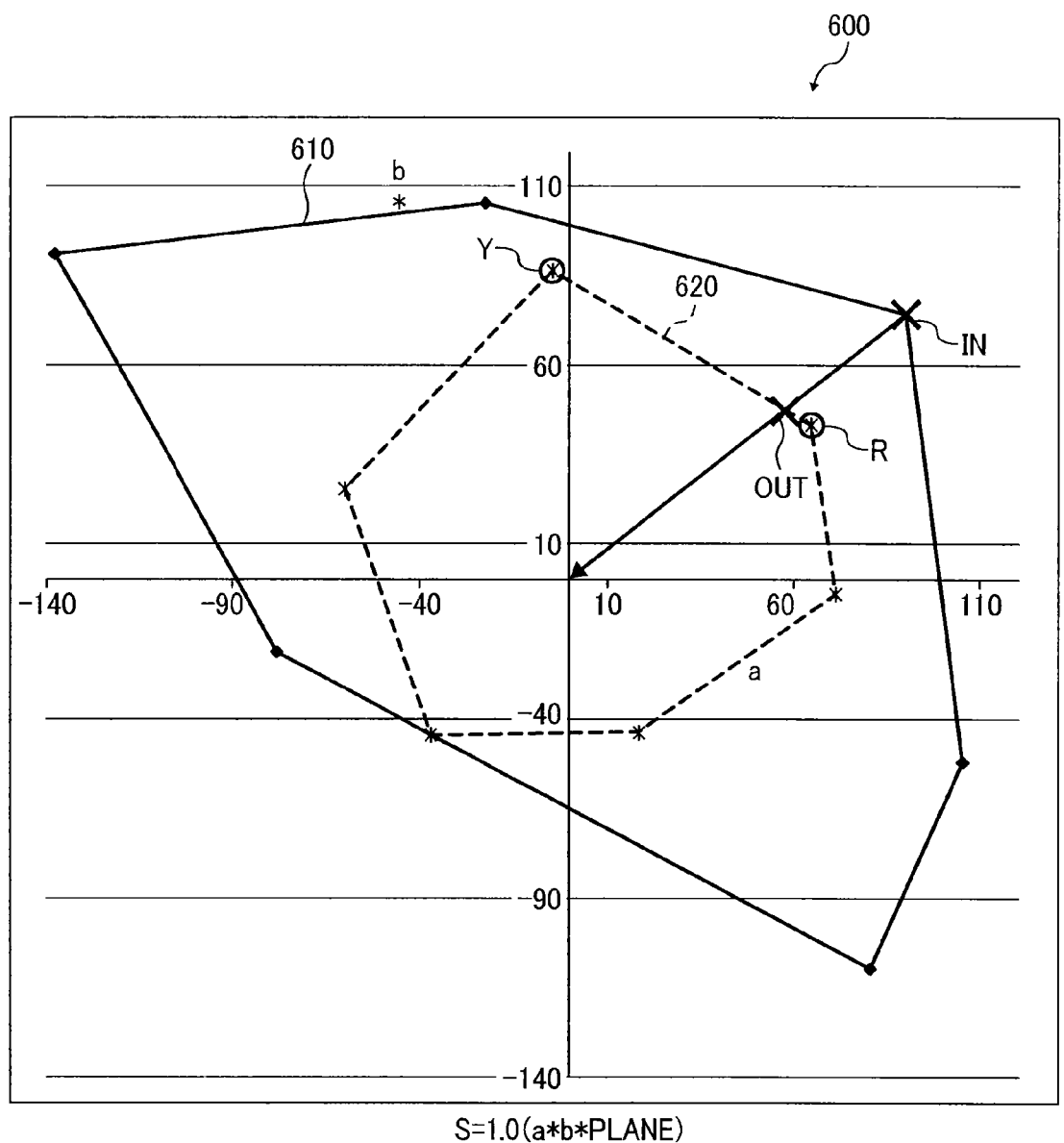

| BEGIN_LUT CLUT 3 3 | | | | | |
|---|---|---|---|---|---|
| RGB_R=32 | RGB_G=32 | RGB_B=32 | Lab_L | Lab_a | Lab_b |
| 0 | 0 | 0 | 0.348 | −127.113 | −127.113 |
| 0 | 0 | 3.226 | 0.784 | −127.086 | −120.802 |
| 0 | 0 | 6.452 | 1.009 | −127.004 | −116.016 |
| 0 | 0 | 9.677 | 1.184 | −126.829 | −111.393 |
| 0 | 0 | 12.903 | 1.407 | −126.568 | −106.109 |
| 0 | 0 | 16.129 | 1.688 | −126.257 | −100.105 |
| 0 | 0 | 19.355 | 2.020 | −125.911 | −93.626 |
| 0 | 0 | 22.581 | 2.397 | −125.521 | −86.856 |
| ... | ... | ... | ... | ... | ... |

| BEGIN_LUT CLUT 3 3 | | | | | |
|---|---|---|---|---|---|
| RGB_R=32 | RGB_G=32 | RGB_B=32 | Lab_L | Lab_a | Lab_b |
| 0 | 0 | 0 | 4.8200 | −0.3400 | 2.1200 |
| 0 | 0 | 3.226 | 7.7006 | −0.2981 | 1.9288 |
| 0 | 0 | 6.452 | 10.5812 | −0.2563 | 1.7375 |
| 0 | 0 | 9.677 | 13.4619 | −0.2144 | 1.5463 |
| 0 | 0 | 12.903 | 16.3425 | −0.1725 | 1.3550 |
| 0 | 0 | 16.129 | 19.2231 | −0.1306 | 1.1638 |
| 0 | 0 | 19.355 | 22.1038 | −0.0888 | 0.9725 |
| 0 | 0 | 22.581 | 24.9844 | −0.0469 | 0.7812 |
| ... | ... | ... | ... | ... | ... |

1010

| BEGIN_LUT CLUT 3 3 | | | | | |
|---|---|---|---|---|---|
| RGB_R=32 | RGB_G=32 | RGB_B=32 | Lab_L | Lab_a | Lab_b |
| 0 | 0 | 0 | 4.8200 | −0.703 | 2.029 |
| 0 | 0 | 3.226 | 7.7006 | −0.629 | 1.848 |
| 0 | 0 | 6.452 | 10.5812 | −0.554 | 1.667 |
| 0 | 0 | 9.677 | 13.4619 | −0.480 | 1.486 |
| 0 | 0 | 12.903 | 16.3425 | −0.405 | 1.305 |
| 0 | 0 | 16.129 | 19.2231 | −0.331 | 1.123 |
| 0 | 0 | 19.355 | 22.1038 | −0.256 | 0.942 |
| 0 | 0 | 22.581 | 24.9844 | −0.182 | 0.761 |
| ... | ... | ... | ... | ... | ... |

IMAGE PROCESSING METHOD AND APPARATUS USING VIRTUAL COLOR GAMUT INFORMATION IN ASSOCIATION WITH COLOR STANDARDS AND PROCESSED STATISTICALLY TO OFFSET A DIFFERENCE IN COLOR REPRODUCIBILITY OF AN OUTPUT APPARATUS

CROSS-REFERENCE TO RELATED APPLICATION

This patent application is based on and claims priority pursuant to 35 U.S.C. §119 to Japanese Patent Application No. 2012-244692, filed on Nov. 6, 2012 in the Japan Patent Office, the entire disclosure of which is hereby incorporated by reference herein.

BACKGROUND

1. Technical Field

The present invention relates to an image processing system, information processing apparatus, and image processing method.

2. Background Art

The range of color reproduction (i.e., color gamut), between color spaces such as input color space of a digital still camera and scanner image data, color space of a display (e.g., standard RGB (sRGB)), and RGB color space proposed by a specific vendor, on the one hand, and devices that output on paper such as a printer on the other is largely different. Also, the color reproducibility range varies in accordance with characteristic of colorant and combination of colorant and recording medium (paper). Therefore, reproducible color hue among printers with different image forming methods, such as electrophotography, inkjet, and thermal transfer, and with different models is different.

If the color gamut that a printer can reproduce varies largely, sometimes a user who edits an image on a desktop needs to reedit the image due to the difference between color on the desktop screen and the color as printed on paper. Also, in commercial printing that prints identically in large quantities, it is possible to suffer a loss that produces massive numbers of printouts that do not satisfy the customer.

Furthermore, sometimes it is requested to print using different printing methods such as electrophotography, inkjet, and thermal transfer depending on the purpose. In that case, sometimes the same color cannot be reproduced due to the difference of printing methods when just a certain level of correction is configured on the desktop screen.

To resolve the issues described above, various technologies have been proposed. For example, to reproduce colors uniformly among multiple output devices, a technology that defines the color gamut of a virtual device that includes color gamut of multiple output devices and whose color gamut shape is similar to those of output devices such as printers rather than input color space such as RGB has been proposed (e.g., JP-2002-252785-A). In addition, in the technology described in JP-2002-252785-A, after storing representative color data that compresses input color data within the color gamut, color compression from the representative color data to color gamut of the output device is performed. Consequently, it is possible to reproduce colors faithfully across different output devices.

To adjust image quality so that it is suitable for each output device, another technology that changes and adjusts parameters in accordance with the type of output device (e.g., inkjet or electrophotography) and recording media (e.g., paper) has also been proposed (e.g., JP-2007-213575-A).

A technology that includes color gamut compression that nestles adjusted colors within the reproducible color hue to prevent colors from being irreproducible with a color image display apparatus after adjustment has also been proposed (e.g., WO-2005-048583-A).

SUMMARY

The present invention provides an improved image processing apparatus that implements an image quality adjustment process that can adjust colors within color hue of an output device that checks colors in case of printing image data on paper. The image processing apparatus implements virtual color gamut information whose shape is similar to that of the output device in the middle of input color space and color hue of the output device, provides reproduced colors on the output device via virtual color gamut information, introduces a coordinate system for adjusting image quality into the virtual color hue information, and provides an image quality adjustment method using the coordinate system on the virtual color hue information.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 7 is a diagram illustrating a color gamut mapping process that maps lattice points on the outermost surface (S=1) into the virtual color gamut described above assuming input color space as RGB and color space as HLS as an embodiment of the present invention.

FIG. 10 is a diagram illustrating 3-D LUT that corresponds to the virtual color gamut information shown in FIG. 8 as an embodiment of the present invention.

DETAILED DESCRIPTION

Figure 1:
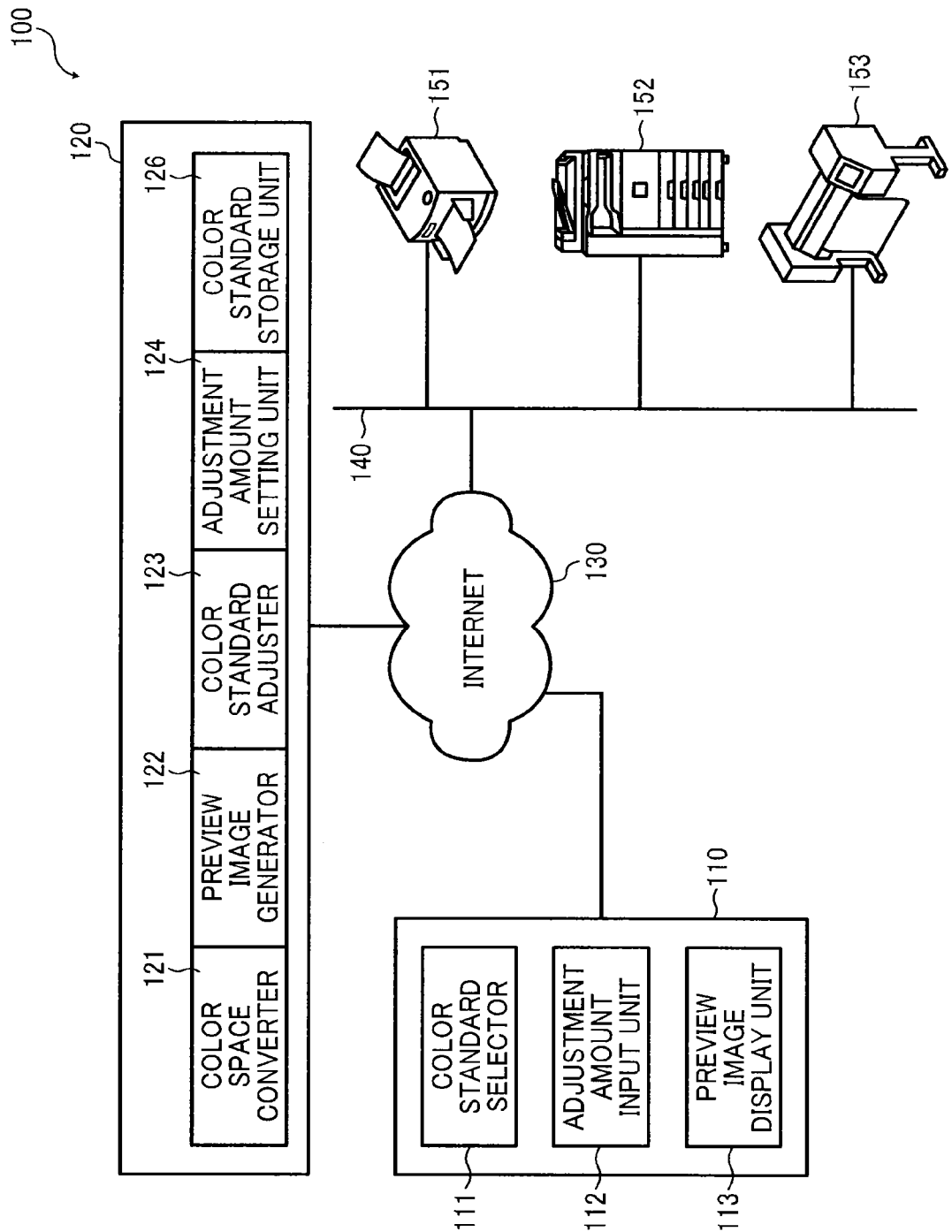
FIG. 1 is a diagram illustrating a configuration of an image processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the technologies described above in JP-2002-252785 and JP-2007-213575, it is assumed that printing is performed by using a local printer. Other than that, a Web-to-Print service that sends image data by using web browsers, etc., via the internet and places an order for printouts has been released recently. In the Web-to-Print service, if a user is not satisfied with image outputs the user adjusts image quality adjusting parameters by using ready-made image parameters, e.g., color hue and color tone such as chroma.

However, accurate characteristics of output device are not provided to a personal computer that the user uses. Therefore, the user has no other choice but to use the L*a*b* coordinate system of uniform color space CIELAB or the JaCbC coordinate system of color appearance model CIECAM02 that the Commission Internationale de l'Eclairage (CIE) proposes. Consequently, the user performs color adjustment using parameters of coordinate systems such as color hue angle and chroma that do not take into account color gamut.

In particular, if the user wants to adjust color in a color hue within image data, the user converts RGB values into L*a*b* values temporarily in accordance with their definition in RGB space and rotates the color hue angle. In this case, color hue angle is rotated while keeping chroma intact, and L*a*b* values after rotation can be out of color gamut of the output device.

In the above case, while color changes on the desktop screen that the user sees when the user adjusts the image quality, color output on paper differs from the color on the desktop screen since color gamut is compressed to enable printing. Consequently, the user feels that the color adjustment is not as expected and repeats the color adjustment, and that results in generating waste of resources. Furthermore, since the color gamut for each output device such as a printer is not considered, adjustment for colors not reproducible with the output device within the range of the coordinate system of input image data can be performed without restriction.

In the technology described in WO-2005-048583, it is possible to nestle adjusted colors within the color hue of an output device. However, in output at the output device, it is possible the color adjustment does not reflect user intention as expected, changing from the color on the display apparatus due to compression of the color gamut. Also, adjustment for colors not reproducible with the output device within the range of the coordinate system of input image data can be performed without restriction.

In the following embodiment, the issues in the conventional technologies described above are resolved, and a technology that makes it possible to reproduce color of printouts without deteriorating color reproducibility on a desktop screen regardless of printing methods of output devices in case of requesting printing via the internet remotely is provided.

FIG. 1 is a diagram illustrating a configuration of an image processing system. An image processing system 100 shown in FIG. 1 is implemented as a so-called Web-to-Print system that places an order for prints with a web server from a web browser, etc., via the internet.

The image processing system 100 shown in FIG. 1 includes the internet 130, a client computer 110 connected to the internet 130, and a server 120. The client computer 110 stores image data to be printed, sends the image data to the server 120, and requests the server 120 to perform an image processing such as color conversion etc. The server 120 applies the image processing requested by the client computer 110 on the received image data and returns the result of the image processing to the client computer 110 interactively. After the user issues a command to print, the server 120 sends the processed image data to output apparatuses 151, 152, and 153 connected via a network such as the internet 130 and a LAN 140. After the server 120 has the output apparatuses 151, 152, and 153 associated with color standard execute printing, the user can acquire prints that satisfy color characteristic etc. that the user intends In case of premising that the system performs commercial printing in this embodiment, prints such as catalogs, fliers, and posters printed to a certain mass amount are targeted. Therefore, it is required to output prints whose color characteristic is consistent with user's intention. After the user issues a request to perform image processing from the client computer 110, the server 120 applies the requested image processing. Functions of the client computer 110, the server 120, and the output apparatuses 151, 152, and 153 are described below in detail.

The client computer 110 is configured as an information processing apparatus such as a personal computer. The client computer 110 implements a web browser and dedicated application that works as a client apparatus that requests the server 120 to perform image processing. The client computer 110 requests the server 120 to perform processing on image data.

The client computer 110 includes a color standard selector 111, an adjustment amount input unit 112, and a preview image display unit 113 as its functional units. The color standard selector 111 enables the user to specify the printing method and paper to be used and color reproduction range of output prints. The adjustment amount input unit 112 configures variables for adjusting color tone of prints to be output on a preview screen to reproduce the colors that the user intends. The preview image display unit 113 displays the preview screen created by the server 120 reflecting the color adjustment specified by using the color standard selector 111 and the adjustment amount input unit 112. These functions can be configured by providing an appropriate UI on the screen of the client computer 110 by the server 120 using structured documents such as HTML and XHTML and Javascript. In another embodiment, the server 120 is accessible by using a dedicated application provided by the server 120.

The server 120 can be implemented as a web server. After receiving image data from the client computer 110, the server 120 reflects color standard selection information and adjustment amount information sent from the client computer 110. Subsequently, the server 120 applies color conversion on the received image data and returns the processed image data as the preview image to the client computer 110. Consequently, interactive modification by the user is supported.

The server 120 includes a color space converter 121 and a preview image generator 122. The color space converter 121 corresponds to a front-end processor that converts input color space used by a user into color space in which image processing is applied. For example, the color space converter 121 converts HLS color space as color space of user input into uniform color space CIE1976 L*a*b* color space. The preview image generator 122 generates a preview image reflecting the color standard adjustment information and adjustment amount information sent from the user and sends the generated preview image to the client computer 110. In this embodiment, HLS color space and RGB color space are referred to as color space independent from output apparatuses hereinafter. In addition, input color space can be either HLS color space or RGB color space depending on implementation format of the client computer 110. In the embodiment described below, HLS color space is the predominant input color space.

A color standard adjuster 123 determines virtual color gamut information provided in this embodiment in accordance with color standard selection information received from the client computer 110. The virtual color gamut information is virtual information that defines range of color gamut reproducible on specific printing paper by using a specific output method considering the output method of the output apparatus and spectral reflection factor of the printing paper. The virtual color gamut information is described in detail later.

An adjustment amount setting unit 124 fine-tunes specified virtual color gamut information, such as an interpolating process for brightness, chroma, and color hue between lattice points defined with reference to brightness value in response to specification by the user. Consequently, the user can add color tone that the user intends on the preview image.

The output apparatuses 151, 152, and 153 are described in detail below in relationship with the color standard adjuster 123. In the present embodiment, the output apparatus 151 is a thermal printer that uses standard paper, the output apparatus 152 is an electrophotographic printer that uses standard paper, and the output apparatus 153 is an inkjet printer that uses standard gloss paper.

Even in a case of not considering the effect of printing paper, color reproduction range of color material varies depending on difference of materials and fixing method if printing methods vary, such as between thermal transfer, electrophotography, and inkjet. Since printed matter reproduces color by not additive color mixture but by subtractive color mixture, brightness, chroma, and hue varies if the spectral reflection factor of printing paper varies.

Therefore, for the color standard that the server 120 needs to consider, the server 120 needs to consider which kind of printing paper the output apparatus uses in addition to the printing method. In this case, the color reproduction range is generally the same regardless of difference of manufacturers and difference of models of the output apparatus that uses the same the printing method. Consequently, if the output method is the same, appropriate values can be calculated by applying statistical processing.

Contrarily, since spectral reflection factor of printing paper is totally different from regular paper, it is not expectable to acquire significant shared color reproduction range even if statistical processing is applied. Therefore, in this embodiment, virtual color gamut information that bridges the difference in color reproduction range between manufacturers and models is provided for each printing method of the output apparatuses 151, 152, and 153 and for each type of printing paper. The virtual color gamut information can be stored in a color standard storage unit 126 comprised of an appropriate storage device in the server 120. The virtual color gamut information can be specified using the color standard selector 111, and the server 120 sends print data to the output apparatus corresponding to the specified color standard adjustment and executes printing.

Printed matter that corresponds to user's intention and user's prediction can be produced by executing process described above by the server 120. For example, if the user selects a color standard specified by inkjet printing and gloss paper on the color standard selector 111, the server 120 in FIG. 1 sends print data to the output apparatus 153 and executes printing accordingly.

Recently, applications presented on a network (e.g., internet) can be used without executing the application and storing various data in local environments. Also, it is becoming popular to store data not in local storage but in network storage. A technology called cloud computing is known to implement usage patterns described above.

The cloud computing environment is generally comprised of many server apparatuses that provide service such as the applications and storage described above, and it is unnecessary for a user to know which server apparatus provides the service that the user utilizes. The image processing system 100 shown in FIG. 1 can be implemented as a cloud computing environment described above comprised of servers that provide the color space converter 121, the preview image generator 122, and the color standard adjuster 123 shown in FIG. 1 individually.

Figure 2:
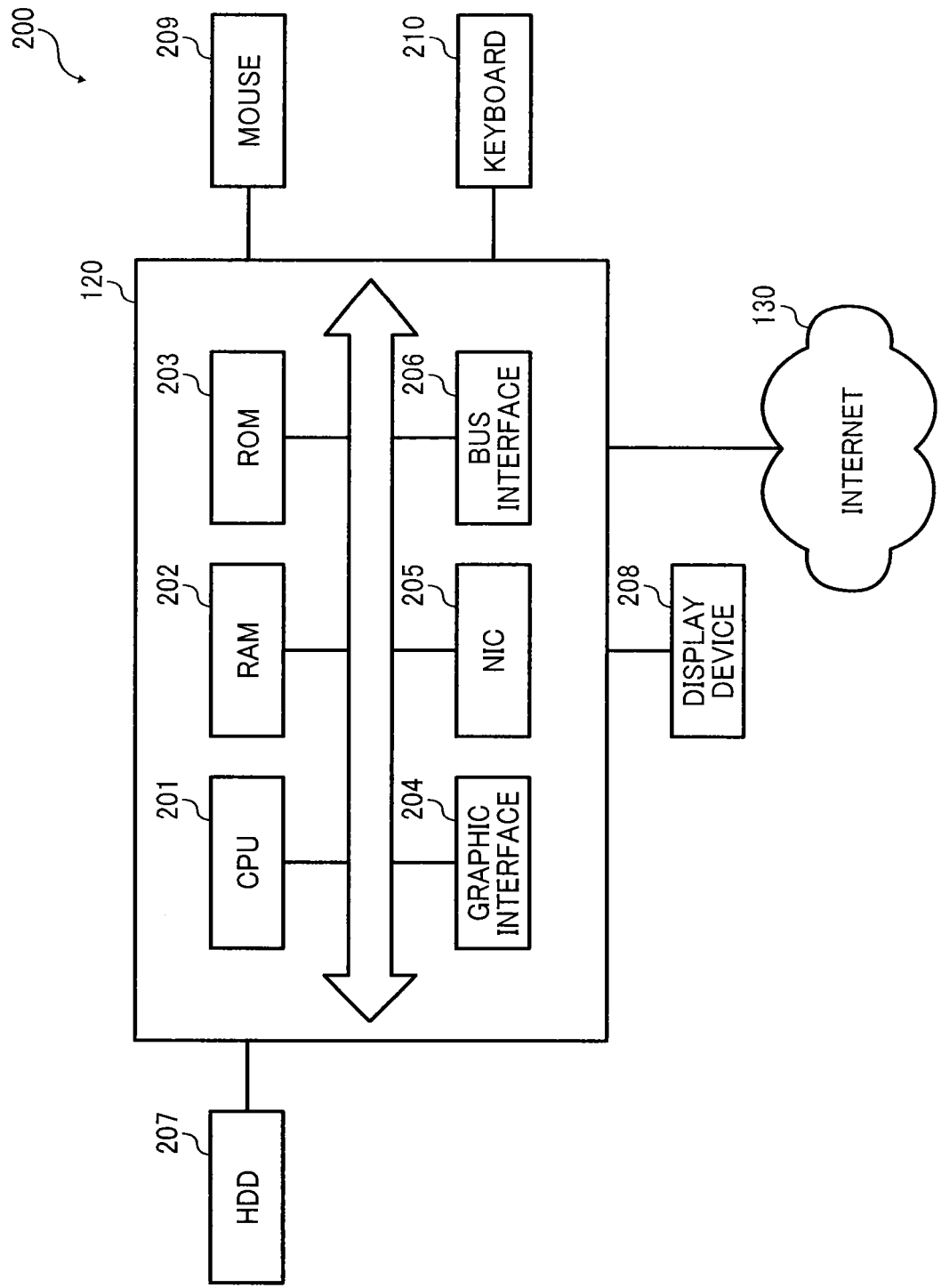
FIG. 2 is a block diagram illustrating a hardware configuration of the image processing system including a server as an embodiment of the present invention.

FIG. 2 is a block diagram illustrating hardware configuration of the image processing system 100 including the server 120 in this embodiment. The server 120 includes a CPU 201, a RAM 202, and a ROM 203, reads applications to execute processes in this embodiment, and uses the RAM 202 as a work area to implement the functional units of this embodiment. The server 120 also includes a graphic interface 204 such as a VGA interface, a network interface card (NIC) 205, and various bus interfaces such as USB bus and PCI bus. Furthermore, the server 120 communicates with various input/output devices such as a HDD 207, a display device 208, the internet 130, a mouse 209, a keyboard 210 via interfaces for each of them. In this embodiment, optionally, a graphic chip can be used to enhance graphic performance.

Figure 3:
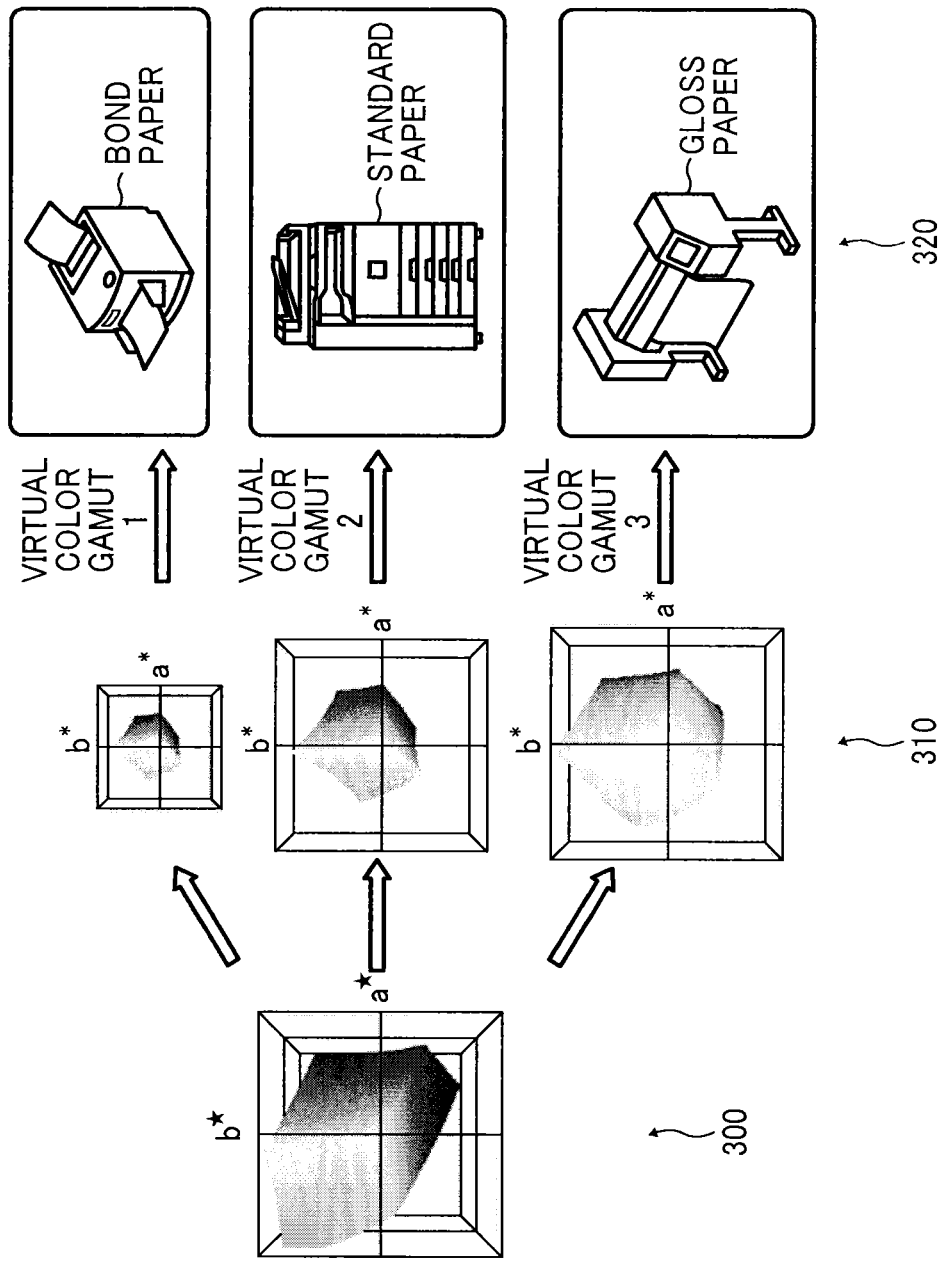
FIG. 3 is a diagram illustrating virtual color reproduction information and a printing apparatus as an embodiment of the present invention.

FIG. 3 is a diagram illustrating virtual color reproduction information and a printing apparatus. Input color gamut 300 shown in FIG. 3 is color system space after converting HLS color space as user input color space into CIE1976L*a*b* color space that the server 120 uses to execute its color processing. Virtual color gamut 310 is illustrated in perspective assuming that a horizontal axis is a*axis, longitudinal axis is b*axis, and L*axis is endways.

It is necessary that the input color gamut 300 has reproducibility of CRT and liquid crystal panel etc. that comprises a desktop screen to be specified on the desktop screen by a user. On the other hand, color reproduction range of the virtual color gamut 310 decreases depending on an output method of an output apparatus 320 and the type of paper. For example, virtual color gamut 1 is assigned to color reproduction range in thermal printing with bond paper, virtual color gamut 2 is assigned to color reproduction range in electrophotography with standard paper, and virtual color gamut 3 is assigned to color reproduction range in inkjet printing with gloss paper.

In this embodiment, the virtual color gamut 1, virtual color gamut 2, and virtual color gamut 3 represent virtual color gamut information assigned to each output method and printing paper. In this embodiment, not only the three modes but also the number of output methods multiplied by applicable printing paper are stored in the color standard storage unit 126 in the server 120. It is preferable to register virtual color gamut information as a form of LUT, although the exact form of implementation is not limited as long as the server 120 can call for processing associated with the specified color standard described above.

As shown in FIG. 3, the input color gamut 300 is still wider compared to the virtual color gamut for example. Consequently, if the user commands to print as is, inappropriate color compression affects color reproduction. As a result, printed matter that does not correspond to the input color gamut 300 is generated, and different color tone is acquired depending on printing paper.

To resolve this issue, in this embodiment, the virtual color gamut 1, virtual color gamut 2, and virtual color gamut 3 that reflect characteristics of both the output method and printing paper are generated, and the server 120 manages them. After generating the input color gamut 300, the server 120 selects virtual color gamut in accordance with color standard adjustment information specified by the user and generates a preview image in which color reproduction is mapped onto the virtual color gamut reflecting adjustment amount information, etc., to bridge the gap to user recognition by sending the generated preview image to the user.

The virtual color gamut information such as the virtual color gamut 1, virtual color gamut 2, and virtual color gamut 3 in this embodiment can be acquired preliminarily by experiment using the printing method and printing paper. In case of using the same printing method and printing paper for example, they can be generated eliminating model and manufacturer idiosyncrasy by acquiring multiple data of different manufacturers and models and averaging them. An example of such a process of generating virtual color gamut information is shown in FIG. 4.

Figure 4:
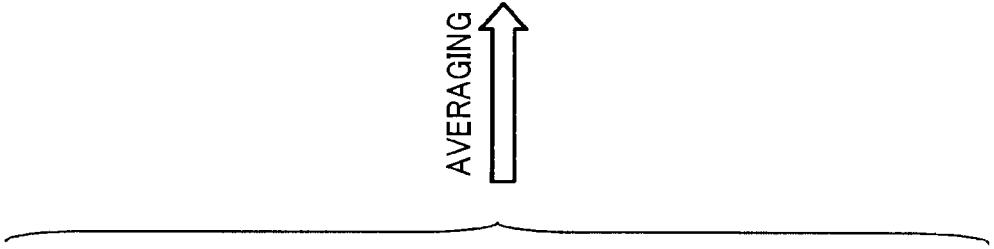
FIG. 4 is a diagram illustrating a table associating CMYK color system with L*a*b* color space in case of printing on paper by using similar types and models as an embodiment of the present invention.

FIG. 4 is a diagram illustrating a table associated CMYK values that corresponds to the outermost surface of color gamut of the output apparatus in CMYK color system with L*a*b* color space in case of printing on printing paper by using similar types and models in the same printing method. Conventionally, this data can be implemented as a LUT for color conversion. After generating virtual color gamut information 410 in units of printing method and printing paper by averaging each row of the tables, the virtual color gamut information 410 is stored in the color standard storage unit 126 associated with identification value for adjusting color standard. If the user sends color standard adjustment information, the corresponding virtual color gamut information 410 is called with reference to the sent color standard adjustment information. In this embodiment, the virtual color gamut information 410 is mapped onto the input color gamut 300.

Figure 5B:
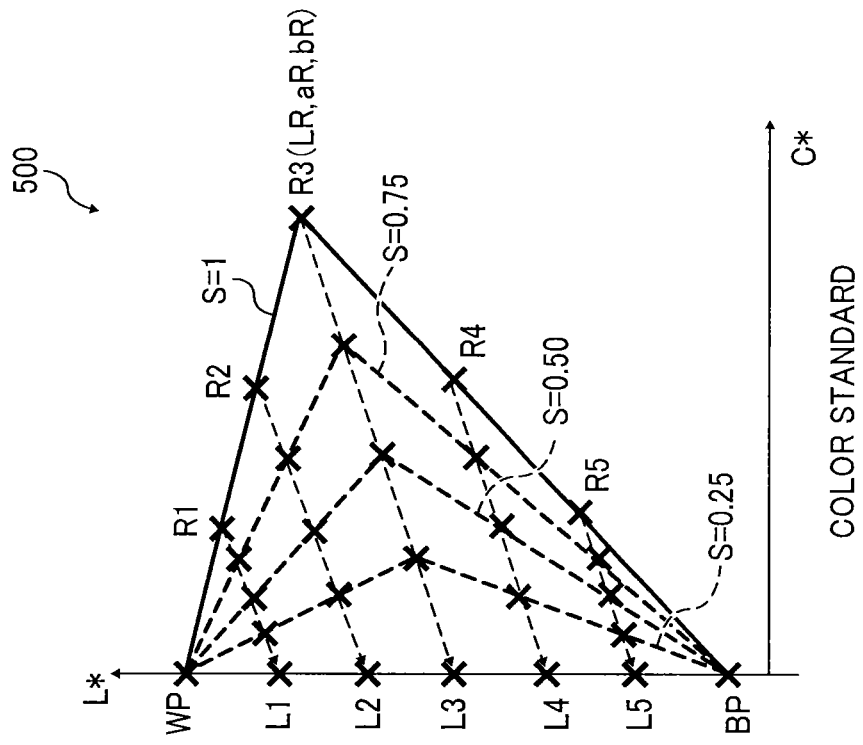
FIG. 5B is a diagram illustrating a definition of lattice point in performing color gamut mapping as an embodiment of the present invention.
Figure 5A:
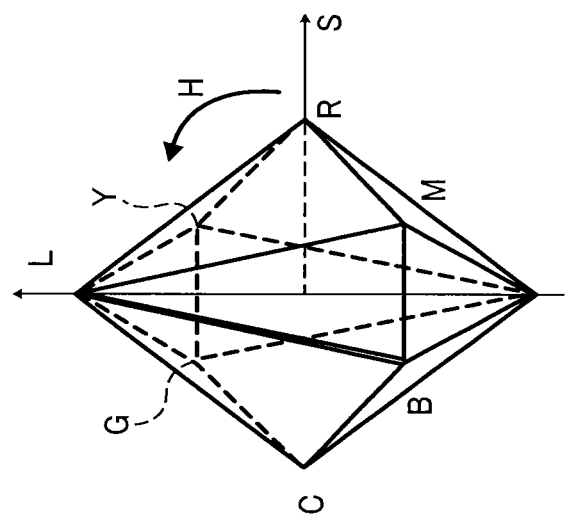
FIG. 5A is a diagram illustrating color space converted from user computer to input color gamut shown in FIG. 3.

FIG. 5A is a diagram illustrating color space converted from user computer to input color gamut shown in FIG. 3, and FIG. 5B is a diagram illustrating a definition of lattice points in performing color gamut mapping in this embodiment. FIG. 5A is a diagram illustrating HLS color space used generally in operating a client computer 110 on its desktop screen recently. In HLS color space, color components are defined by R, Y, G, C, B, and M, L=0.5 place is considered as standard plane, color hue (H) is given by rotation angle h from R, and brightness (S) is given by distance from intersection point of the standard plane and brightness axis (L) within the plane. On the brightness axis, the minimum point indicates black (BP), and the maximum point indicates white (WP).

FIG. 5B is a diagram illustrating a process that maps the HLS color space shown in FIG. 5B onto virtual color gamut information and generates lattice points to perform the mapping concurrently. In FIG. 5B, the longitudinal axis indicates brightness L*, and the horizontal axis indicates brightness C* (given by sqrt(a*^2+b*^2)). In the embodiment shown in FIG. 5B, after selecting specific virtual color gamut information, assignment of L*a*b* values on lattice points where brightness L is divided by 2N+1 and chroma S is divided by M is described For RED color hue specified by H=0 in the selected specific virtual color gamut information. Here, N and M are positive integer, and N=2 and M=4 in the embodiment shown in FIG. 4.

L*a*b* values (assuming LR, aR, bR) H=0, L=0.5, and S=1.0 corresponds R3 in FIG. 5B in accordance with C=0, M=100, Y=100, and K=0 that corresponds to RED (R) point in virtual color gamut information. Similarly, L*a*b* value for WP is assumed as L*a*b* value at C=M=Y=K=0 (LWP, aWP, bWP) in virtual color gamut, and L*a*b* value for BP is assumed as (LBP, aBP, bBP).

Next, L*a*b* values that corresponds to points R1, R2, R4, and R5 on lines that connect R3 with WP and R3 with BP each are calculated by interpolating coordinates of WP, BP, and R3 described above in order to generate lattice points. In this embodiment, the interpolation can be calculated as described below. Here, L*a*b* value of exemplary R1 is assumed as (LR1, aR1, bR1).

Equation 1

$$LR1=\{(LWP-LR)/3\}*2+LR$$

$$aR1=\{(aWP-aR)/3\}*2+aR$$

$$bR1=\{(bWP-bR)/3\}*2+bR \quad (1)$$

While detailed description is omitted, L*a*b* values can be calculated for R2, R3, R4, and R5 similarly. Subsequently, L*a*b* values for L1, L2, L3, L4, and L5 in FIG. 5(*b*) are described. L*a*b* value for L3 (assuming LL3, aL3, bL3) can be calculated as follows from L*a*b* values for WP and BP in the same way of R1, R2, R3, R4, and R5.

Equation 2

$$LL3=\{(LWP-LBP)/6\}*3+LBP$$

$$aL3=\{(aWP-aBP)/6\}*3+aBP$$

$$bL3=\{(bWP-bBP)/6\}*3+bBP \quad (2)$$

Similarly, L*a*b* values for L1, L2, L4, and L5 can be calculated. Furthermore, L*a*b* values at lattice points that correspond to S=0.75 to 0.25 on R3 and L3 can be calculated by dividing L*a*b* values of R3 and L3 equally in the number of M. L*a*b* values can be calculated similarly for other lattice points.

The example of color hue H=0 has been described above. Similarly, for H=60, 120, . . . 300 in HLS color space shown in FIG. 5A, it can be calculated by using virtual color gamut information. In calculating L*a*b* values for lattice points of H=30, 90, . . . , it is possible to calculate by interpolating data on lattice points of H=0 and H=60 in case of H=30.

As described above, lattice points in HLS color space can be mapped onto lattice points in color space that correspond to virtual color gamut information indicated by L*a*b* color space. By performing this process, a 3-D Look Up Table (LUT) that associates HLS values with L*a*b* values of virtual color information can be defined.

Furthermore, a 3-D LUT associated with RGB values and L*a*b* values on lattice points where RGB color space is divided equally can be calculated, and is considered a color standard. Conversely, L*a*b* value for any RGB value can be calculated by converting into HLS value by using equation 1 and interpolating L*a*b* values for the HLS values from 3-D LUT. In the interpolation, known interpolating method such as cubic interpolation and tetrahedral interpolation can be used. The 3-D LUT is defined for each piece of virtual color gamut information shown in FIG. 3 and stored in the server 120.

Color standard is defined by associating HLS lattice points with L*a*b* values in virtual color gamut by generating a 3-D LUT mapping associated lattice points on the outermost surface of HLS (RGB) as device-independent color space with points on the outermost surface in virtual color gamut. Furthermore, in the present invention, it is possible to reflect fine-tuning in HLS color space on color conversion by allowing input on adjustment amount. Consequently, the user can reflect fine color adjustment on the display device on output color within color gamut range.

Figure 6B:
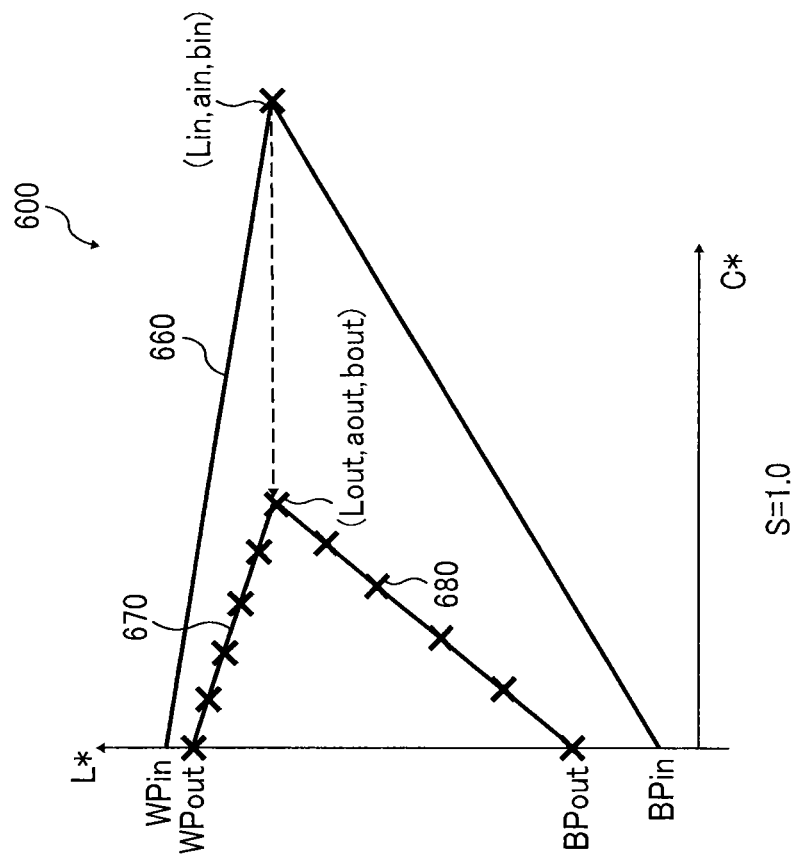
FIG. 6B is a diagram illustrating lattice points on the outermost surface (S=1) into the virtual color gamut described above assuming input color space as RGB and color space as HLS as an embodiment of the present invention.
Figure 6A:
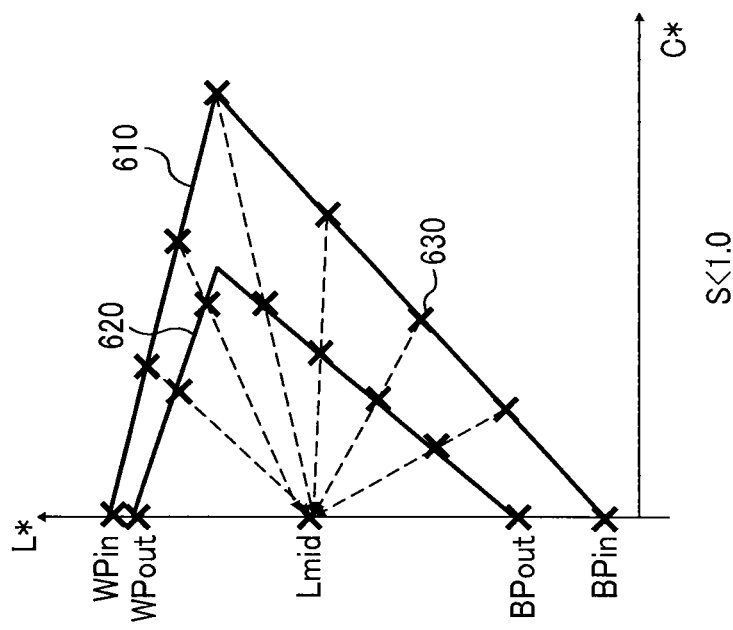
FIG. 6A is a diagram illustrating a color gamut mapping process on inner lattice points.

FIGS. 6A and 6B are diagrams illustrating processes that map all lattice points on HLS input color space including S=0 to S=1 onto the virtual color gamut described above. FIG. 6A illustrates color gamut mapping for S<1 lattice points, and FIG. 6B illustrates color gamut mapping for S=1.0. First, an example of S=1.0 shown in FIG. 6B will be described below. Similarly as mapping color standard, L*a*b* values are calculated by interpolating associated mapping source of the highest chroma point on line 660, Wpout (white color point of virtual color gamut information (paper white)), and Bpout (black color point of virtual color gamut information) with line 670 of the highest brightness in virtual color gamut information. For the line 660, as described in FIG. 4, lattice points are defined, and color gamut mapping is performed associating for each lattice point by interpolating.

On the other hand, for S<1.0 HLS lattice points, as shown in FIG. 6A, after fixing a fixed point Lmid on brightness L* axis and considering the fixed point Lmid as center, color gamut mapping can be performed associating lattice points toward the center point. Furthermore, L*a*b* values that fit within virtual color gamut can be calculated by using known any color gamut mapping method, such as calculating points intersecting with interpolation lines between lattice points of virtual color gamut information. This process will be described below with reference to FIGS. 6A and 6B and FIG. 7.

First, lattice points that divide HLS color space equally is defined just the same as the color standard as described above. In this description, color hue angle is assumed as H=0 in order to simplify the description. Among H=0 lattice points, first, color gamut mapping destination for S=1, L=0.5, i.e., the highest chroma point, is determined. Value that converts RGB value at the highest chroma point at H=0 ((255, 0, 0) in 8-bit) into L*a*b* value based on definition in the RGB color space is assumed as (Lin, ain, bin).

Next, two data points whose one or more colors of CMY equal 100% and nestle (Lin, ain, bin) among virtual color gamut information (here Y(LY, aY, bY) and R(LR, aR, bR)) are extracted. In this case, point (Lout, aout, bout) in FIG. 7 can be calculated by using following equation (3).

Equation 3

$$L\text{out} = t*(LR-LY)+LY$$

$$a\text{out} = t*(aR-aY)+aY$$

$$b\text{out} = t*(bR-bY)+bY \quad (3)$$

In the above equations, parameter t is real number from 0 to 1. After calculating (Lout, aout, bout) varying t from 0 to 1 in steps of 0.01 for example, t whose bout/aout value is the closest to bin/ain value is calculated. Subsequently, (Lout, aout, bout) with the calculated t is considered as L*a*b* value of color gamut mapping destination for the highest chroma point in input color space.

As described above, after allocating L*a*b* values that fit within virtual color gamut to lattice points that divide HLS space equally, 3-D LUT associated HLS values with L*a*b* values can be defined. Subsequently, 3-D LUT associated RGB values of lattice points that divide input RGB color space equally with L*a*b* values can be calculated by interpolating the 3-D LUT described above just the same as 3-D LUT for color conversion. This 3-D LUT is defined as a color conversion method. These color conversion methods are defined for each virtual color gamut shown in FIG. 3.

Figure 9:
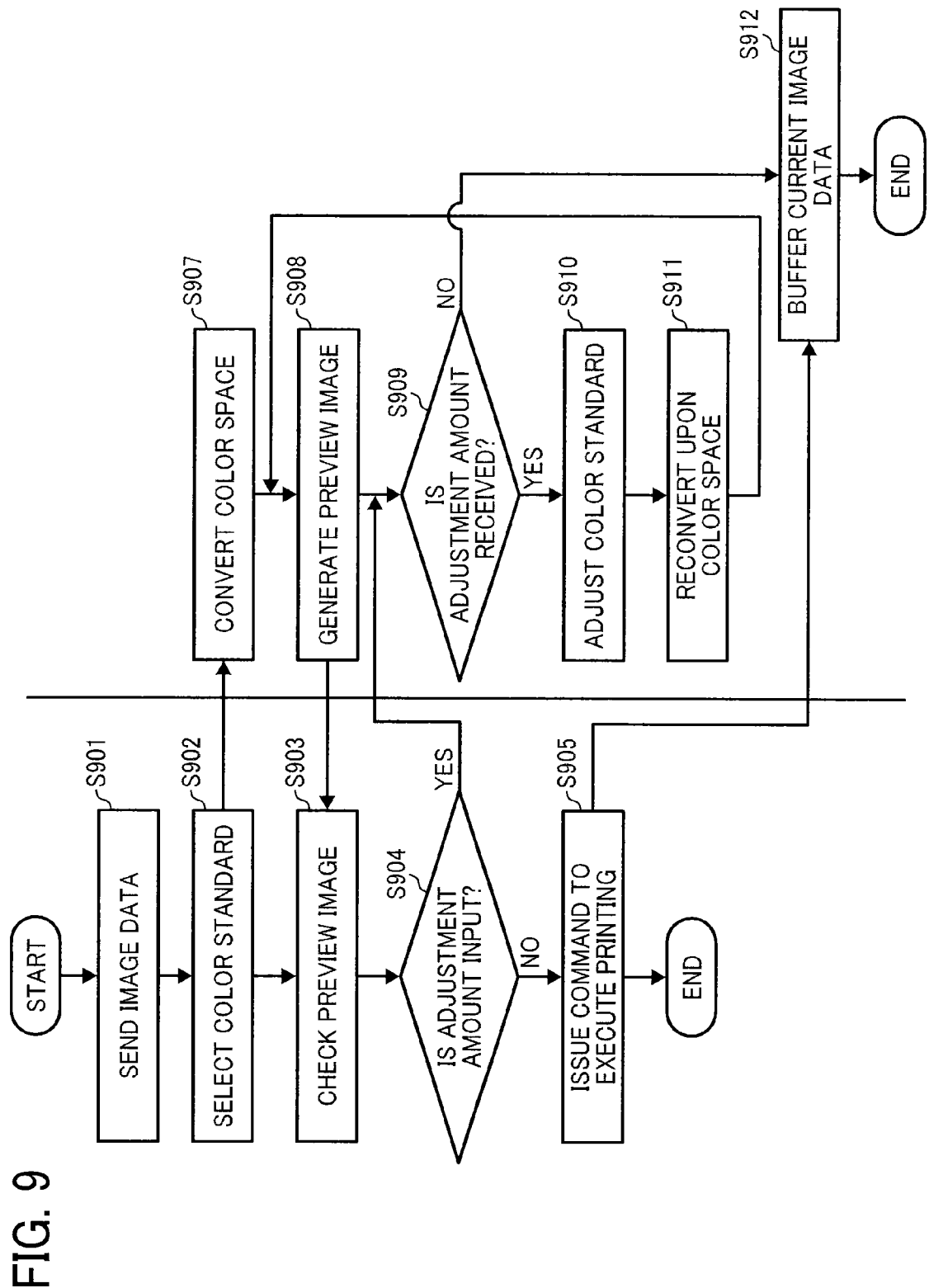
FIG. 9 is a flowchart illustrating a process that the image processing system executes as an embodiment of the present invention.

FIG. 9 is a flowchart illustrating a process that the image processing system 100 executes. In FIG. 9, the left side is a process executed by the client computer 110 and the right side is a process executed by the server 120. First, a user (orderer) starts the process. In S901, the Uniform Resource Identifier (URI) of a website that provides Web-to-Print service is input to a web browser on the client computer 110 connected to a network. Alternatively, the user can access the website by selecting the URI from a bookmark.

The user can input the URI to predetermined position in the web browser by using a keyboard connected to a terminal, or the user can select the bookmark of the web browser using a mouse connected to the terminal. By performing this operation, the user can access Hyper Text Markup Language (HTML) for example to have the web server execute an image processing by Web-to-Print service via the internet.

After receiving the access request from the user terminal, the web server has display a web page to provide a User Interface (UI) of Web-to-Print service. This web page can be configured as a form, and its usability can be improved by using JavaScript, etc. After displaying the web page provided as the form, for example, the client computer 110 specifies image data via the UI displayed on the web browser in S901. After specifying the image data, the image data is sent from the client computer 110 to the server 120 using a POST method etc. by clicking a "Send" button etc.

After sending the image data, a web page that includes the color standard selector 111 and the adjust amount input unit 112 as input fields is displayed on the web browser of the client computer 110. The user selects the color standard that corresponds to multiple output apparatuses (output apparatuses 151, 152, and 153 in FIG. 1) and type of paper on the color standard selector 111 considering use of the image (such as fliers and catalogs) and output (printing) cost for example. After selecting the color standard, the user sends the information to the web server in S902.

The web server operates as a daemon process or a service process. After receiving the image data and the color standard selection information, the web server sends them to the color space converter 121 in S907. After receiving each piece of data, the color space converter 121 executes color conversion from RGB to L*a*b* applying the 3-D LUT shown in FIG. 8 on the image data. Subsequently, the generated L*a*b* values are mapped onto the virtual color gamut information decided by referring to the color standard selection information and compressed to the color gamut of the specified color standard in this embodiment.

Next, the image compressed with the color gamut is converted from L*a*b* color space to RGB system again and sent to the client computer 110 as a preview image in S908. The user checks the preview image on the desktop screen in S903. If the user is not satisfied with the preview image displayed on the preview screen, the user inputs adjustment amount in S904. The adjustment amount means an amount that fine-tunes lattice points and correction method used when the 3-D LUT was generated, such as a process to fine-tune a position of a lattice point of chroma, brightness, and color hue, etc., in performing interpolation in accordance with user's preference.

Next, the process executed by the client computer 110 will be described below. If the user is satisfied with the preview image, adjustment amount is not input (NO in S904). Subsequently, if an "OK" button or a "Print" button is clicked, a command to execute printing is issued in S905. The web server sends image data managed in current thread to output apparatus associated with the color standard selection information and has the output apparatus execute printing. Subsequently, the transaction in the client computer 110 ends after the user quits the web browser.

The process from S909 to S911 is a process executed when the user inputs adjustment amount. The web server determines whether or not the adjustment amount is received in S909. If the adjustment amount is not received (NO in S909), in S912, the image data compressed with the current color standard selection information is stored until a printing command is received. Alternatively, if the adjustment amount is received (YES in S909), adjustment of color standard is executed in S910. Specifically, adjustment of color standard corresponds to the process that fine-tunes mapping onto lattice points of corresponding virtual color gamut information.

A specific adjusting process will be described below with reference to FIG. 10. FIG. 10 is a diagram illustrating 3-D LUT that corresponds to the virtual color gamut information shown in FIG. 8. In FIG. 10, 3-D LUT 1000 is data before adjusting, and 3-D LUT 1010 is data after adjusting. The user can increase, decrease, enlarge, and reduce color hue, chroma, and brightness value, etc., at lattice points on lines from L=0.25 to L=1.0 by adjusting the UI displayed on the desktop screen of the client computer 110. After modifying default values of the 3-D LUT 1000 by the adjustment described above, the 3-D LUT 1010 is generated. In FIG. 10, by comparison of the 3-D LUT 1000 with the 3-D LUT 1010, it can be seen that a* and b* are slightly shifted to negative direction and L* is maintained in the 3-D LUT 1010.

After finishing adjustment of color standard in S910, the process in S907 is applied again in S911, and RGB values of image data are mapped onto the modified virtual color gamut information. Subsequently, the preview image is generated and sent to the client computer 110 in S908. Color correction is repeated until the user is satisfied. The virtual color gamut information adjusted and generated in the sequence is registered in appropriate buffer memory in the order of update to enable redo operation by the user.

Also, the image data that generated the preview image is stored in buffer memory in S912 as previously described. After receiving a command to execute printing, the image data is sent to the associated output apparatus, and printing is executed.

Figure 11:
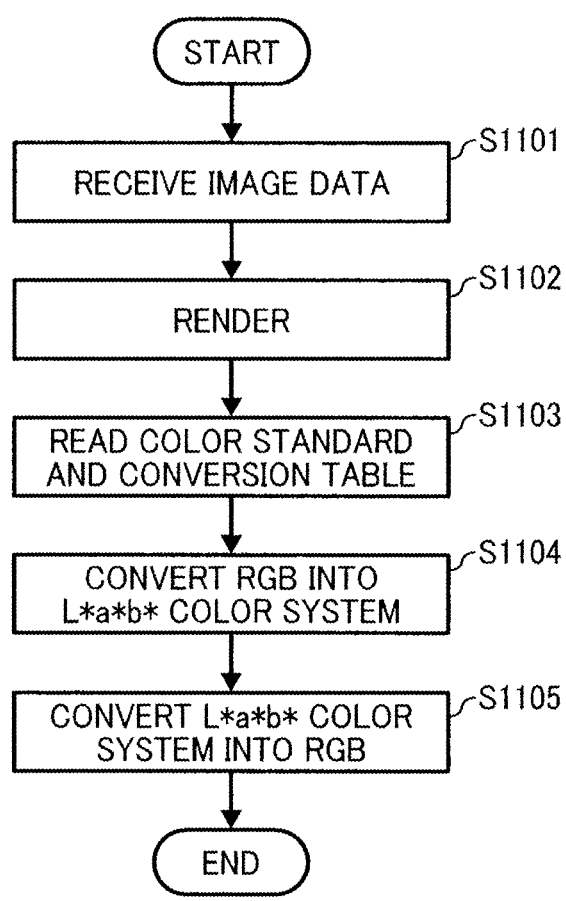
FIG. 11 is a flowchart illustrating a color conversion process that generates a preview image in S907 shown in FIG. 9 as an embodiment of the present invention.

FIG. 11 is a flowchart illustrating the color conversion process that generates the preview image in S907 shown in FIG. 9. After starting the process, image data is received in S1101. An image to be previewed is generated by rendering the image data in S1102. The color standard selection information and the corresponding virtual 3-D LUT is read in S1103, and color conversion with compression is performed from RGB to L*a*b* color space in S1104. In S1105, after reconverting into RGB to generate the preview image that complies with L*a*b*, the preview image to be presented to the user is generated and is sent to the client computer 110. Subsequently, the process ends. Thus, a preview image compressed to reproducible range with the virtual color gamut information can be provided.

A process executed by the color space converter 121 in the server 120 will be described below.

After receiving image data from the web server, the color space converter 121 expands a part of the image data written in Page Description Language (PDL), etc., and converts the image data into raster data. Subsequently, the color space converter 121 reads the specified color standard from the color standard storage unit 126 and the virtual color gamut information that is stored preliminarily and corresponds to the read color standard. Subsequently, the input image data is converted into L*a*b* values by interpolating the virtual color gamut information (3-D LUT).

Figure 8:
FIG. 8 is a diagram illustrating 3-D LUT associating RGB values with L*a*b* values at lattice points that divide input RGB color space equally as an embodiment of the present invention.

Furthermore, the L*a*b* values after conversion (L*a*b* values that fit within virtual color gamut) are converted into image data with RGB values by applying the 3-D LUT shown in FIG. 8. A process to convert into RGB image data will be described below specifically.

First, L*a*b* values converted according to the color conversion table is assumed as (Lin, ain, bin). Also, any L*a*b* value in the middle right side of the 3-D LUT shown in FIG. 8 is assumed as (Ln, an, bn). First, (Ln, an, bn) where color difference ΔEab described with equation 4 below becomes the eighth smallest from the minimum value and corresponding RGB value is searched against (Lin, ain, bin).

Equation 4

$$\Delta Eab = \{(Lin-Ln)^2 + (ain-an)^2 + (bin-bn)^2\}^{(1/2)} \quad (4)$$

RGB values and L*a*b* values at the searched eight points are registered as a matrix with 3 rows and 16 columns (R1, G1, B1) ... (R8, G8, B8), (L1, a1, b1) ... (L8, a8, b8). Furthermore, eight coefficients that have values from 0 to 1 and whose total sum becomes 1 are assumed as values from α1 to α8. In this case, L*a*b* value (Lout, aout, bout) calculated by weighted average of the eight points is described in the following equations.

Equation 5

$$Lout = (\alpha 1*L1 + \alpha 2*L2 + \alpha 3*L3 + \alpha 4*L4 + \alpha 5*L5 + \alpha 6*L6 + \alpha 7*L7 + \alpha 8*L8)/8$$

$$aout = (\alpha 1*a1 + \alpha 2*a2 + \alpha 3*a3 + \alpha 4*a4 + \alpha 5*a5 + \alpha 6*a6 + \alpha 7*a7 + \alpha 8*a8)/8$$

$$bout = (\alpha 1*b1 + \alpha 2*b2 + \alpha 3*b3 + \alpha 4*b4 + \alpha 5*b5 + \alpha 6*b6 + \alpha 7*b7 + \alpha 8*b8)/8 \quad (5)$$

Next, (Lout, aout, bout) is calculated by changing α1 ... α8 to satisfy the above condition, and color difference ΔEab between (Lout, aout, bout) and (Lin, ain and bin) is calculated. Subsequently, α1 ... α8 that the color difference ΔEab becomes smaller than a predefined value (e.g., below 0.1) is determined, and RGB value that corresponds to (Lin, ain, bin) is determined as follows.

Equation 6

$$R = \alpha 1*R1 + \alpha 2*R2 + \alpha 3*R3 + \alpha 4*R4 + \alpha 5*R5 + \alpha 6*R6 + \alpha 7*R7 + \alpha 8*R8$$

$$G = \alpha 1*G1 + \alpha 2*G2 + \alpha 3*G3 + \alpha 4*G4 + \alpha 5*G5 + \alpha 6*G6 + \alpha 7*G7 + \alpha 8*G8$$

$$B = \alpha1*B1 + \alpha2*B2 + \alpha3*B3 + \alpha4*B4 + \alpha5*B5 + \alpha6*B6 + \alpha7*B7 + \alpha8*B8 \quad (6)$$

As described above, image data presented as the preview image is generated from the compressed L*a*b*, and the corresponding color standard is added to the image as profile. Also, for conversion to RGB value, after calculating RGB values as described above for lattice points that divide L*a*b* space evenly, conversion of color space can be performed by interpolating a table associated the L*a*b* values with the RGB values.

Figure 12:
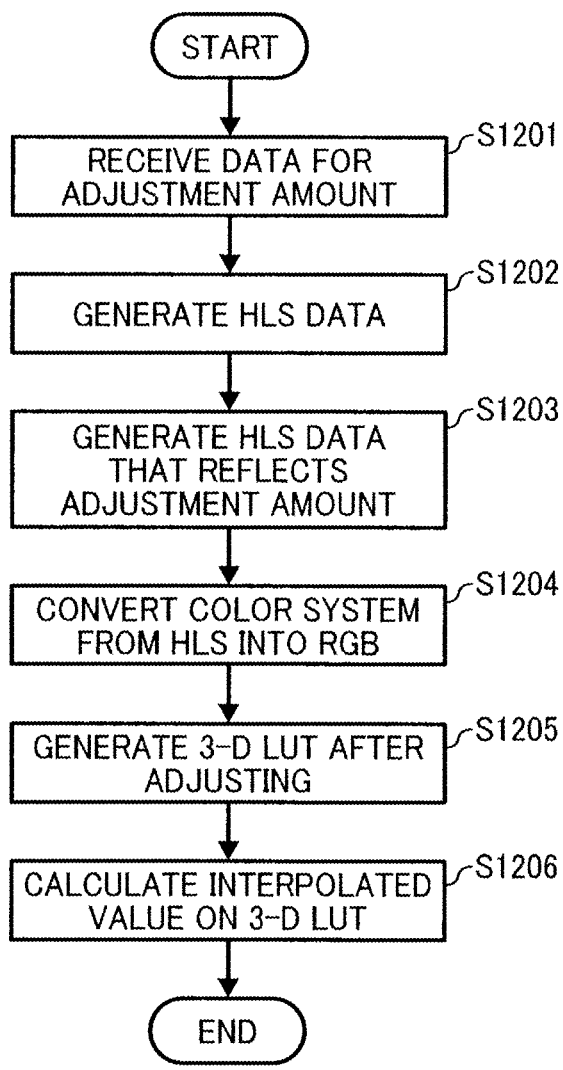
FIG. 12 is a flowchart illustrating a process in S910 shown in FIG. 9 in detail as an embodiment of the present invention.

FIG. 12 is a flowchart illustrating the process in S910 shown in FIG. 9 in detail. In FIG. 12, after starting the process, adjustment amount data is received in S1201. HLS data is generated in S1202, and HLS lattice point data that reflects the adjustment amount is generated in S1203. Subsequently, color space is converted from HLS to RGB in S1204, and 3-D LUT adjusted in accordance with FIGS. 6 and 7 is generated in S1205. Afterwards, interpolating calculation is performed by using the 3-D LUT, and 3-D LUT after adjusting is completed in S1206. After that, the process ends.

The process described above and executed by the color standard adjuster 123 in the server 120 will be described below.

After receiving the input adjustment amount, lattice point data that divides HLS color space evenly is generated just the same as described in FIG. 5B. Subsequently, For lattice points where the adjustment amount is input, the adjustment amount is added or subtracted, and the results are written as H'L'S' value. (For lattice points where the adjustment amount is zero, HLS equals H'L'S'.) Afterwards, the adjusted H'L'S' lattice point data is converted into RGB value, and L*a*b* value for the RGB value is calculated by interpolating the color standard shown in FIG. 10 (the table associated RGB values with L*a*b* values). Consequently, a mapping table associating HLS lattice points that divide HLS color space evenly with L*a*b* that reflects the input adjustment amount can be produced. Furthermore, a color standard that reflects adjustment by the user as the table 1010 shown in FIG. 10 can be generated by calculating L*a*b* values for RGB lattice point data by interpolating the mapping table associated HLS that reflects the adjustment amount with L*a*b* values. These processes are performed for each color standard.

Figure 13:
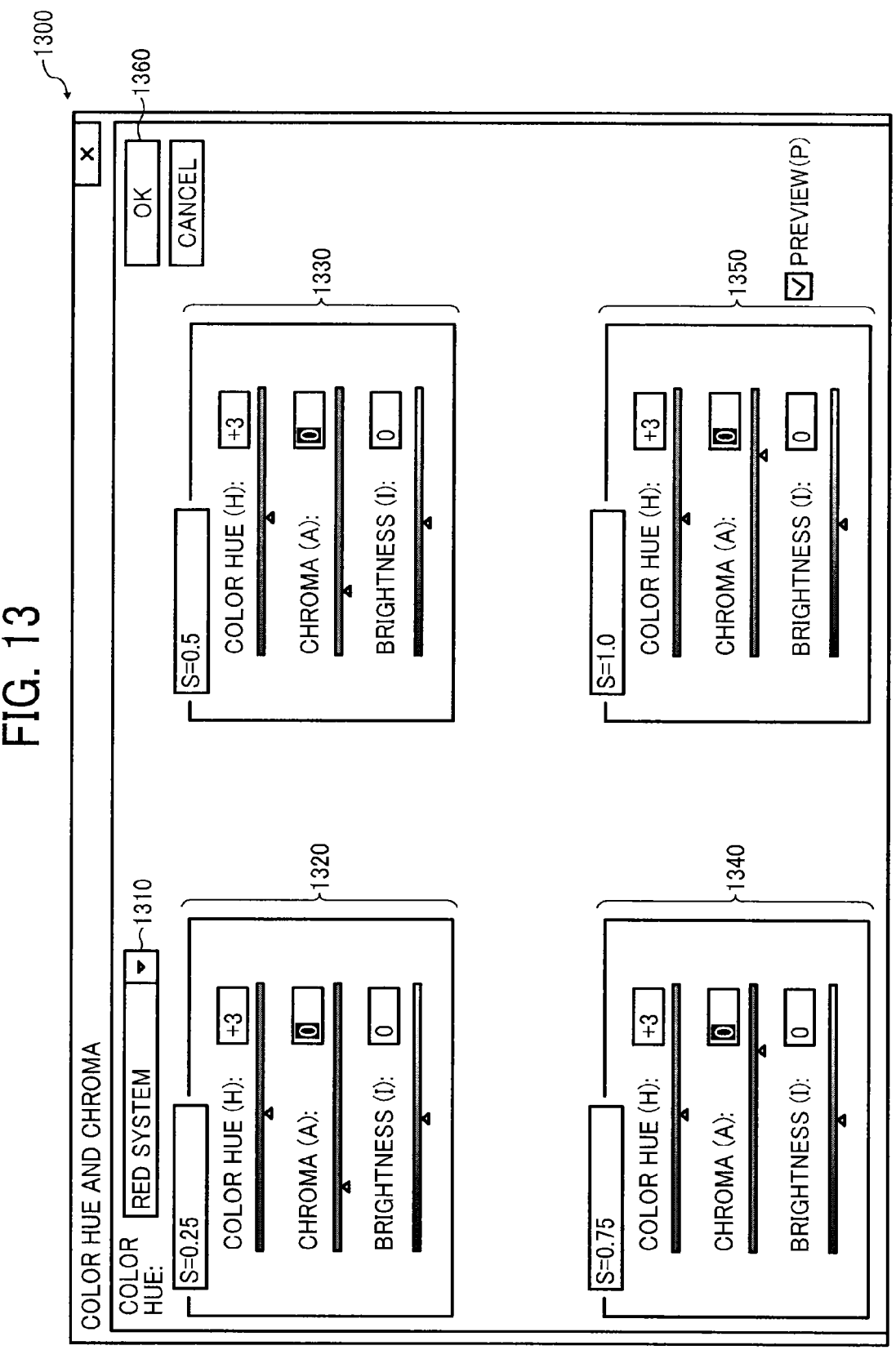
FIG. 13 is a diagram illustrating a User Interface (UI) that an adjustment amount input unit displays on a desktop screen of a user computer via a web browser as an embodiment of the present invention.

FIG. 13 is a diagram illustrating a UI 1300 that an adjustment amount input unit displays on a desktop screen of a user computer via the web browser. In the UI 1300 shown in FIG. 13, the user can select color hue for each chroma S value 1320, 1330, 1340, and 1350 in HLS color space and input adjustment amount for color hue angle H, chroma S, and brightness L for each chroma by using a slide bar or entering numbers as shown in FIG. 13. In FIG. 13, red (H=0) is selected as color hue to be adjusted in an input box 1310.

In a preferred embodiment, adjustment amount for color hue angle H can be limited to within +60°. As shown in FIG. 5A, for red color hue, adjacent color hue yellow (smaller than +60° (59°)) can be upper limit, and adjacent color hue magenta (smaller than)) −60° (−59°)) can be lower limit. For color hues between red and yellow, and between red and magenta, it is preferable to set the adjustment amount so that relative positions are maintained. For example, if adjustment amount +10° is input to red color hue, color hue angle for red, yellow, and intermediate color hue (hereinafter referred to as RY) before adjustment can be described as follows.

Equation 7

(Before adjustment)

Y_H=60

RY_H=30

R_H=0

(After adjustment)

Y_H=60

R_H=10

$$(30-0)/(60-0) = (RY\_H - 10)/(60-10) \therefore RY\_H = 35 \quad (7)$$

For chroma, in the embodiment shown in FIG. 13, the user can input adjustment amount for each chroma from S=0.25 to S=1.0. However, the value range that S can take in HLS color space is from 0 to 1, and the user can input adjustment amount within that range. Initial values of slide bar for chroma S are S=0.25, 0.5, 0.75, and 1.0, and the user inputs the difference from the initial values as adjustment amount. For example, if the adjustment amount for S=0.25 is larger than +0.25, chroma order with S=0.5 becomes reversed. Therefore, in that case, adjustment amount for S=0.5 is set so that it equals chroma S=0.25 after adjustment. For example, if the adjustment amount +0.35 is set for S=0.25, S=0.25+0.35 equals 0.6. Therefore, adjustment amount 0.6−0.5=+0.1 is set for S=0.5. For S=1.0, only minus adjustment amount can be input since the upper limit of S in HLS color space is 1.0.

Similarly, the value range that brightness can take is from 0 to 1, and adjustment amount can be set for each color hue and chroma. As described above, the user can set the adjustment amount.

Figure 14:
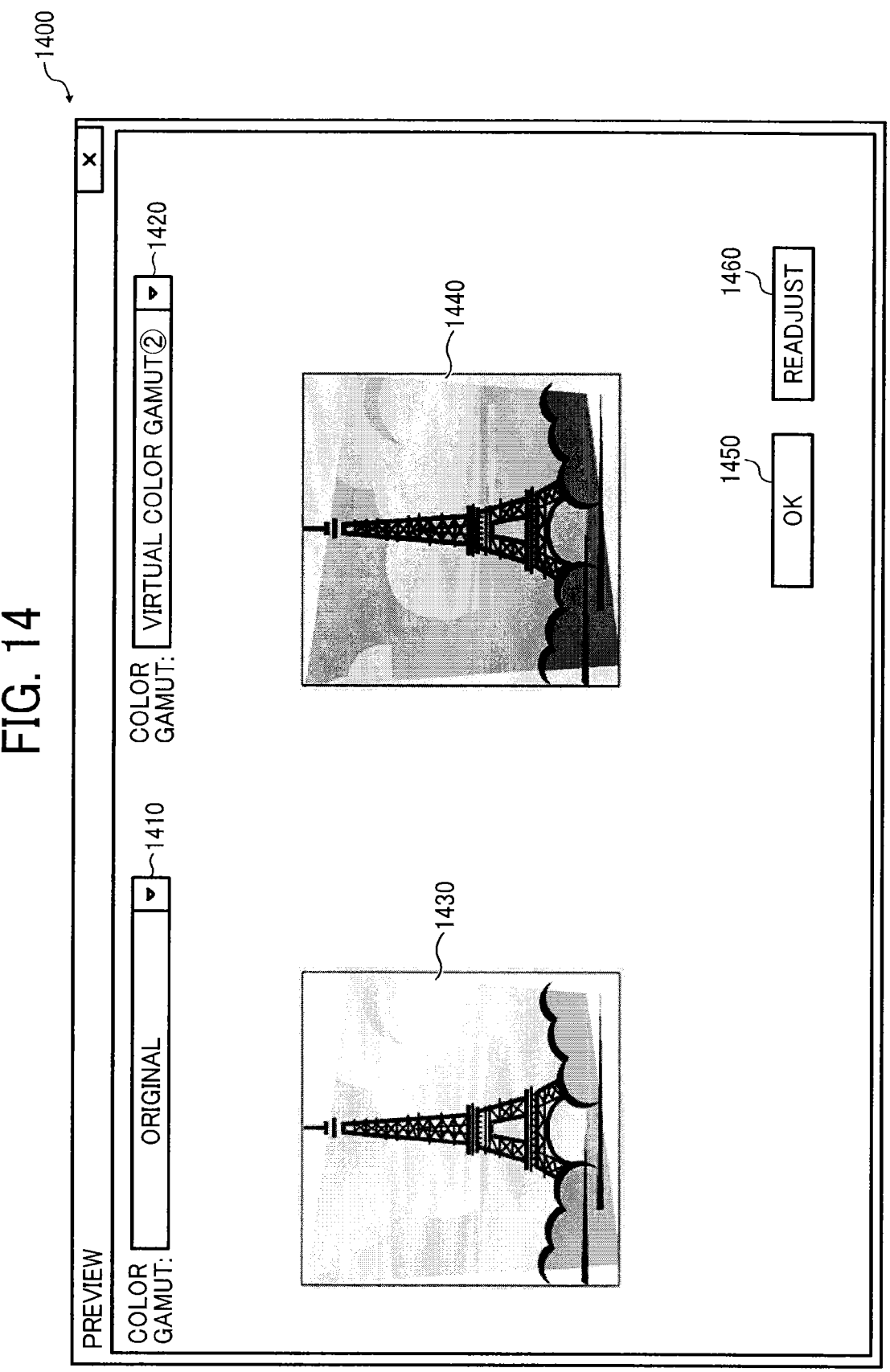
FIG. 14 is a diagram illustrating a preview screen shown to a user as an embodiment of the present invention.

FIG. 14 is a diagram illustrating the preview screen shown to the user. In the preview image shown in FIG. 14, an image 1430 on the left side corresponds to image data in original HLS color space and a preview image 1440 on the right side is color-reproduced by the virtual color gamut 2. Since the virtual color gamut 2 is an environment where the color reproduction range is narrow, the preview image is color-compressed compared to the original image data and is displayed as the image whose color reproducibility is deteriorated. If the user is satisfied with the preview image, the user clicks an "OK" button 1450. The "OK" button 1450 includes capability to issue a command to print to the server 120. If the command of the "OK" button 1450 is sent by the user, the server 120 sends data for color reproduction buffered currently to an output apparatus that corresponds to the color standard and has the output apparatus execute printing.

If the user is not satisfied with the preview image 1440, the adjustment amount input screen 1300 is displayed by clicking a "Readjust" button 1460. After adjusting various parameters, the adjustment amount is sent to the web server, and it is possible to generate and display the preview again and again until the user is satisfied.

The functions in the present invention described above can be implemented by executable program code written in object oriented programming languages such as C++, Java, JavaBeans, JavaApplet, JavaScript, Perl, Ruby, and Python. The program code can be distributed by storing in readable recording media.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image processing system in which multiple image forming apparatuses are connected via a network, comprising:
   a color standard storage unit to store multiple color standards by which an output apparatus that includes a shared output method specifies a range of color reproduction;
   a virtual color gamut information unit stored in association with the color standard and processed statistically so as to offset a difference in color reproducibility of the output apparatus that includes a shared output method;
   a color space converter to convert image data input from the network into image data in color space of the color standard; and
   a preview image generator to color-compress the image data in the color standard within a range of color reproduction of an output apparatus and to generate a preview image from the image data generated after color-compression,
   wherein the image processing system calls the color standard to process images by associating color space independent of output apparatus with virtual color gamut information dependent on output method.

2. The image processing system according to claim 1, further comprising a server to display on a client computer:
   a color standard selector to select the color standard;
   an adjustment amount input unit to input adjustment amount for the color standard; and
   a preview image display unit to display a preview image on a display screen.

3. The image processing system according to claim 2, further comprising an interface unit to input adjustment amount on color hue, chroma, and brightness for each color hue for the color space independent of output apparatus.

4. The image processing system according to claim 2, wherein the preview image generator executes color-compression of image data input with the color standard that reflects the input adjustment amount in case the adjustment amount is sent from the adjustment amount input unit and regenerates a preview image that reflects the color-compression.

5. The image processing system according to claim 2, wherein one or more of the color space converter, the preview image generator, the color standard selector, and the color standard storage unit is connected to the preview image display unit via a network in which global IP addresses are assigned.

6. An information processing apparatus, comprising:
   a color standard storage unit to store multiple color standards by which an output apparatus that includes a shared output method specifies a range of color reproduction;
   a virtual color gamut information unit stored in association with the color standard and processed statistically so as to offset a difference in color reproducibility of the output apparatus that includes a shared output method;
   a color space converter to convert image data input from the network into image data in color space of the color standard; and
   a preview image generator to color-compress the image data in the color standard within range of color reproduction of an output apparatus and to generate a preview image from the image data generated after color-compression,
   wherein the image processing apparatus calls the color standard to process images by associating color space independent of output apparatus with virtual color gamut information dependent on output method.

7. The information processing apparatus according to claim 6, further comprising:
   a display unit to display following units on a client computer connected to the information processing apparatus via a network;
   a color standard selector to select the color standard;
   an adjustment amount input unit to input adjustment amount for the color standard; and
   a preview image display unit to display a preview image on a display screen,
   wherein the adjustment amount input unit comprises an interface unit to input adjustment amount on color hue, chroma, and brightness for each color hue for the color space independent from the output apparatus.

8. The information processing apparatus according to claim 7, wherein the preview image generator executes color-compression of image data input with the color standard that reflects the input adjustment amount in case the adjustment amount is sent from the adjustment amount input unit and regenerates a preview image that reflects the color-compression.

9. The information processing apparatus according to claim 6, wherein one or more of the color space converter, the preview image generator, the color standard selector, and the color standard storage unit is connected to the client computer via a network in which global IP addresses are assigned.

10. A method of processing information, comprising the steps of:
   storing multiple color standards by which an output apparatus that includes a shared output method specifies a range of color reproduction;
   storing virtual color gamut information in association with the color standards and processed statistically so as to offset a difference in color reproducibility of the output apparatus that includes a shared output method;
   converting image data input from the network into image data in color space of the color standard;
   color-compressing the image data in the color standard within the range of color reproduction of an output apparatus and generating a preview image from the image data generated after color-compression; and
   calling the color standard to process images by associating color space independent of output apparatus with virtual color gamut information dependent on output method.

* * * * *